United States Patent
Takahashi (10) Patent No.: US 7,394,645 B2
(45) Date of Patent: Jul. 1, 2008

(54) MULTILAYER CAPACITOR

(75) Inventor: Akihiro Takahashi, Kirishima (JP)

(73) Assignee: Kyocera Corporation, Kyoto (JP)

( * ) Notice: Subject to any disclaimer, the term of this patent is extended or adjusted under 35 U.S.C. 154(b) by 153 days.

(21) Appl. No.: 11/459,833

(22) Filed: Jul. 25, 2006

(65) Prior Publication Data
US 2007/0025053 A1  Feb. 1, 2007

(30) Foreign Application Priority Data
Jul. 26, 2005  (JP) .............................. 2005-216358

(51) Int. Cl.
*H01G 4/005* (2006.01)
*H01G 4/228* (2006.01)

(52) U.S. Cl. ...................... 361/303; 361/309; 29/25.42
(58) Field of Classification Search ................ 361/303, 361/306.3, 308.1, 309
See application file for complete search history.

(56) References Cited

U.S. PATENT DOCUMENTS

| | | | | |
|---|---|---|---|---|
| 4,356,529 A * | 10/1982 | Kopel | ........................ | 361/304 |
| 5,880,925 A * | 3/1999 | DuPre et al. | ................ | 361/303 |
| 6,072,687 A | 6/2000 | Naito et al. | ................ | 361/303 |
| 6,091,598 A * | 7/2000 | Kobayashi | ................... | 361/303 |
| 6,188,565 B1 | 2/2001 | Naito et al. | ................ | 361/303 |
| 6,191,932 B1 * | 2/2001 | Kuroda et al. | .............. | 361/303 |
| 6,215,647 B1 | 4/2001 | Naito et al. | ................ | 361/303 |
| 6,226,169 B1 | 5/2001 | Naito et al. | ................ | 361/303 |
| 6,266,228 B1 | 7/2001 | Naito et al. | ............. | 361/306.1 |
| 6,266,229 B1 | 7/2001 | Naito et al. | ............. | 361/306.3 |
| 6,292,350 B1 | 9/2001 | Naito et al. | ............. | 361/306.3 |
| 6,940,710 B1 * | 9/2005 | Lee et al. | ................. | 361/321.2 |
| 7,046,500 B2 * | 5/2006 | Lee et al. | .................... | 361/303 |
| 7,319,582 B2 * | 1/2008 | Takashima et al. | .......... | 361/303 |
| 2001/0055191 A1 | 12/2001 | Naito et al. | ................ | 361/303 |
| 2006/0039097 A1 * | 2/2006 | Satou | ........................ | 361/303 |
| 2006/0221545 A1 * | 10/2006 | Togashi | ...................... | 361/303 |
| 2007/0019363 A1 * | 1/2007 | Roy | ........................... | 361/303 |

FOREIGN PATENT DOCUMENTS

| | | |
|---|---|---|
| JP | 2991175 | 10/1999 |
| JP | 3514195 | 1/2004 |
| WO | WO 99/00807 | 1/1999 |

* cited by examiner

*Primary Examiner*—Eric Thomas
(74) *Attorney, Agent, or Firm*—Hogan & Hartson LLP (57) ABSTRACT

A multilayer capacitor according to the present invention comprises a multilayer body 2 including a plurality of dielectric layers laminated together, first internal electrodes 3 and second internal electrodes 4 that are arranged alternately with the dielectric layers interposed therebetween inside the multilayer body 2, first extension portions 5a extended from the first internal electrodes 3 to one lateral side A of the multilayer body 2 at one or a plural number of locations, and second extension portions 5b extended from the first internal electrodes 3 to another lateral side B of the multilayer body 2 at one or a plural number of locations, wherein the length of the first extension portions 5a is different from the length of the second extension portions 5b. As a result, the multilayer capacitor according to the present invention have electrical characteristics combining two electrical characteristics in which series resonance points are formed at different frequencies, the "effective frequency band" with low impedance is widened.

12 Claims, 9 Drawing Sheets

MULTILAYER CAPACITOR

BACKGROUND OF THE INVENTION

1. Field of the Invention

The present invention relates to a multilayer capacitor which is suitably used for decoupling circuits and the like for supplying electric power from a power source to circuitry such as IC (Integrated Circuit).

2. Description of Related Art

A decoupling circuit is a circuit which is connected between an IC and a power source for suppressing fluctuations in voltage by rapidly charging or discharging in response to fluctuations in electric current supplied from the power source to the IC.

The function to rapidly charge or discharge electric current is attained by decreasing impedance of the decoupling circuit.

A desirable decoupling circuit has electrical characteristics with a wide frequency band in which impedance is low (referred to as "effective frequency band"). Owing to this, current fluctuations including those occurring at low frequencies as well as those occurring at high frequencies can be suppressed. Such a decoupling circuit can be constructed by connecting a plurality of capacitors each having a different "effective frequency band" in parallel.

The following is one example of conventionally known multilayer capacitors used for decoupling circuits.

A multilayer capacitor comprises a multilayer body including a plurality of dielectric layers laminated together, a plurality of first internal electrodes and second internal electrodes that are disposed alternately so as to be opposed to each other with the dielectric layers interposed in between, first extension portions and second extension portions are extended to lateral sides of the multilayer body at a plurality of locations. The first extension portions and second extension portions located vertically in the stacking direction are electrically interconnected, respectively, thereby to form a first terminal electrode and a second terminal electrode along the stacking direction on the lateral sides of the multilayer body (See WO99/00807, for example).

In the foregoing multilayer capacitor, the equivalent series inductance is minimized by forming a plurality of extension portions extended from internal electrodes so as to shorten the current flow path. Accordingly, it has electrical characteristics with the series resonance point shifted to the higher frequency side. Since an area in the vicinity of this series resonance point corresponds to the "effective frequency band", such a multilayer capacitor is allowed to function on the higher frequency side when used for a decoupling circuit.

The multilayer capacitor used for a decoupling circuit is preferably one with an "effective frequency band" which covers a wide frequency range. For example, the foregoing multilayer capacitor in which the number of extension portions is increased has a smaller equivalent series inductance and an "effective frequency band" that is extended on the higher frequency side.

However, in such a multilayer capacitor, due to the lowered equivalent series inductance, the impedance at the series resonance point is greatly decreased. For this reason, the impedance at the parallel resonance point created with another capacitor in the decoupling circuit is high, which sometimes causes the decoupling circuit to have electrical characteristics in which the impedance is higher than the standard value in a specific frequency band.

As described above, when a multilayer capacitor with a wide "effective frequency band" is employed for a decoupling circuit, the problem of too high impedance at the parallel resonance point created with another capacitor is prone to arise.

It is therefore an object of the present invention to provide a multilayer capacitor with a wide "effective frequency band" with which it is possible to suppress the impedance at the parallel resonance point created with another capacitor in a decoupling circuit.

SUMMARY OF THE INVENTION

A multilayer capacitor according to the present invention comprises: a multilayer body including a plurality of dielectric layers; first internal electrodes and second internal electrodes arranged alternately so as to be opposed to one another with the dielectric layer interposed therebetween; first extension portion extended from the first internal electrode to one lateral side of the multilayer body at one or a plurality of locations; second extension portion extended from the first internal electrode to another lateral side of the multilayer body at one or a plurality of locations; third extension portion extended from the second internal electrode to any one lateral side of the multilayer body; and fourth extension portion extended from the second internal electrode to any one lateral side of the multilayer body other than the lateral side to which the third extension portions are extended. Furthermore, it comprises a first terminal electrode for electrically interconnecting the first extension portions located vertically in the stacking direction to one another; a second terminal electrode for electrically interconnecting the second extension portions located vertically in the stacking direction to one another; a third terminal electrode for electrically interconnecting the third extension portions located vertically in the stacking direction to one another; and a fourth terminal electrode for electrically interconnecting the fourth extension portions located vertically in the stacking direction to one another, wherein the length of the first extension portion is different from the length of the second extension portion and/or the length of the third extension portion is different from the length of the fourth extension portion.

According to the multilayer capacitor of the present invention, inductance is higher or lower when a current flows in and out of the first terminal electrode than when the current flows in and out of the second terminal electrode. Accordingly, the series resonant point varies depending on which terminal the current flowing in the multilayer capacitor passes through. Therefore, as overall electrical characteristics of the multilayer capacitor in which the first and second terminal electrodes are connected to each other, the "effective frequency band" is formed over a wide frequency range.

Also, since the multilayer capacitor according to the present invention is realized by combining electrical characteristics of two capacitors in which series resonance points are formed at different frequencies, there is little possibility that "degeneration of a series resonance point causes the impedance at the frequency to drop greatly". Accordingly, it is possible to suppress impedance to be low at the parallel resonance point between other capacitors in a circuit using this multilayer capacitor.

According to another aspect of the multilayer capacitor of the present invention, it is preferable that the first extension portions are extended from the first internal electrode at a plurality of locations to be connected to a plurality of the first terminal electrodes, the second extension portions are extended from the first internal electrode at a plurality of locations to be connected to a plurality of the second terminal electrodes, the third extension portions are extended from the second internal electrode at a plurality of locations to be connected to a plurality of the third terminal electrodes, the fourth extension portions are extended from the second internal electrode at a plurality of locations to be connected to a plurality of the fourth terminal electrodes. By providing a plurality of extension portions, the multilayer capacitor is allowed to have smaller equivalent series inductance, and the "effective frequency band" thereof is widened to the higher frequency side.

Furthermore, it is also possible to adopt a structure in which the dielectric layers have rectangular shapes, the lateral side to which the first extension portions are extended is the same side as the lateral side to which the third extension portions are extended, and the lateral side to which the second extension portions are extended is the same side as the lateral side to which the fourth extension portions are extended and is a side opposed to the lateral side to which the first extension portions are extended.

According to this structure, the multilayer capacitor is in the form of a rectangular parallelepiped, so that the first terminal electrode and third terminal electrode are provided on one lateral side of the rectangular parallelepiped, and the second terminal electrode and fourth terminal electrode are provided on the other lateral side of the rectangular parallelepiped opposed thereto.

In addition, each of the first and second internal electrodes may be electrically divided into two regions including a first region near one lateral side of the multilayer body and a second region near the other lateral side.

In this case, the electrical characteristics achieved when a current flows in and out of the terminal electrodes on one lateral side of the multilayer body and the electrical characteristics achieved when the current flows in and out of the terminal electrodes on the other lateral side are different in capacitance. As a result, the difference in frequency of series resonant point becomes great between each of the lateral sides, which enables realization of a wider "effective frequency band".

In particular, it is preferable that the area of the first region and the area of the second region are different from each other.

Furthermore, in the case of the first to fourth extension portions being extended from the internal electrodes at a plurality of locations, the arrangement may be such that the lateral side to which the first extension portions are extended is the same side as the lateral side to which the third extension portions are extended, and the lateral side to which the second extension portions are extended is the same side as the lateral side to which the fourth extension portions are extended, and a plurality of the first terminal electrodes and a plurality of the third terminal electrodes are arranged alternately on one lateral side of the multilayer body and a plurality of the second terminal electrodes and a plurality of the fourth terminal electrodes are arranged alternately on the other lateral side of the multilayer body.

In this structure, since the directions of a current flowing through the first terminal electrodes and a current flowing through the adjacent third terminal electrodes are reverse to each other, and the directions of a current flowing through the second terminal electrodes and a current flowing through the adjacent fourth terminal electrodes are reverse to each other, magnetic fluxes generated from the respective currents cancel each other, resulting in a greatly reduced inductance.

In addition, it is possible that the multilayer capacitor according to the present invention further comprises: fifth extension portion extended from the first internal electrode to a lateral side of the multilayer body at one or a plural number of locations; sixth extension portion extended from the first internal electrode to a lateral side of the multilayer body at one or a plural number of locations; seventh extension portion extended from the second internal electrode to a lateral side of the multilayer body at one or a plural number of locations; and eighth extension portion extended from the second internal electrodes to a lateral side of the multilayer body at one or a plural number of locations.

It is preferable that it further comprises a fifth terminal electrode for electrically interconnecting the fifth extension portions located vertically in the stacking direction; a sixth terminal electrode for electrically interconnecting the sixth extension portions located vertically in the stacking direction; a seventh terminal electrode for electrically interconnecting the seventh extension portions located vertically in the stacking direction; and an eighth terminal electrode for electrically interconnecting the eighth extension portions located vertically in the stacking direction, wherein the length of the fifth extension portion is different from the length of the sixth extension portion and/or the length of the seventh extension portion is different from the length of the eighth extension portion.

In this case, the electrical characteristics achieved when a current flows in and out of the fifth terminal electrode and the sixth terminal electrode and the electrical characteristics achieved when a current flows in and out of the seventh terminal electrode and the eighth terminal electrode are different in series resonance point between the respective lateral sides. As a result, a wider "effective frequency band" can be realized. In addition, by increasing the number of the extension portions, the multilayer capacitor has a smaller equivalent series inductance, which result in an "effective frequency band" widened to the higher frequency side.

When the lengths of the first extension portions, the second extension portions, and the lengths of the fifth extension portions and the sixth extension portions are different from one another, the number of non-degenerated series resonance points is increased. As a result, as the overall electrical characteristics of the multilayer capacitor, a particularly wide "effective frequency band" is realized.

The same applies to when the lengths of the third extension portions and the fourth extension portions, and the lengths of the seventh extension portions and the eighth extension portions are different from each other.

A process of producing a multilayer capacitor according to the present invention comprises the steps of: producing a plural number of ceramic green sheets; preparing a first composite green sheet by forming a first internal electrode pattern provided with a first extension portion and a second extension portion each having a different length from each other in each block area on one principal surface of the ceramic green sheet; preparing a second composite green sheet by forming a second internal electrode pattern provided with a third extension portion and a fourth extension portion each having a different length from each other in each block area on one principal surface of another ceramic green sheet; producing a multilayer sheet by stacking a plurality of the first composite green sheets and the second composite green sheets so that the first internal electrode patterns and the second internal electrode patterns are opposed to each other with the ceramic green sheets interposed therebetween and by pressure bonding. Subsequently, the multilayer sheet is cut along the respective sides of the block areas to obtain multilayer bodies separated by each of block area, and then the multilayer bodies are fired. By this step, the first to fourth extension portions are exposed at the cut surfaces of the plural number of separated pieces of multilayer bodies. Then, the multilayer bodies are fired, and first to fourth terminal electrodes for electrically interconnecting the first to fourth extension portions, respectively, that are exposed at the cut surfaces of the fired multilayer bodies are formed.

In addition, a process of producing a multilayer capacitor according to the present invention may be arranged such that, in the foregoing production method, the lengths of the first extension portions and the second extension portions are equal to each other, and the lengths of the third extension portions and the fourth extension portions are equal to each other, and the multilayer sheet is cut along cut lines spaced apart by a predetermined distance from the respective sides of the block areas so that multilayer bodies separated by each of the block areas are obtained. Also by this cutting method, the first extension portions to the fourth extension portions with different lengths can be exposed at the cut surfaces of the multilayer bodies.

These and other advantages, features and effects of the present invention will be apparent from the following description of embodiments with reference to the accompanying drawings.

DETAILED DESCRIPTION OF THE INVENTION

Figure 1:
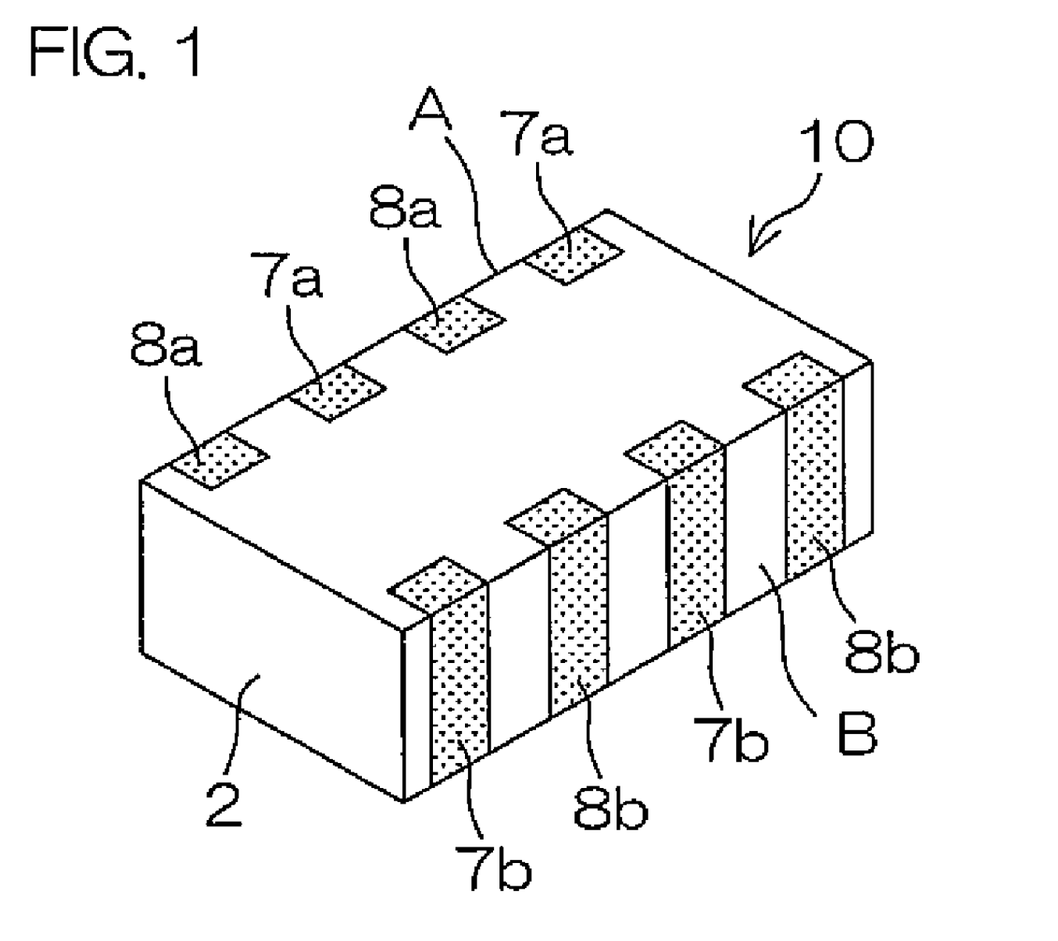
FIG. 1 is a perspective view showing the exterior appearance of one embodiment of the multilayer capacitor according to the present invention.
Figure 2A:
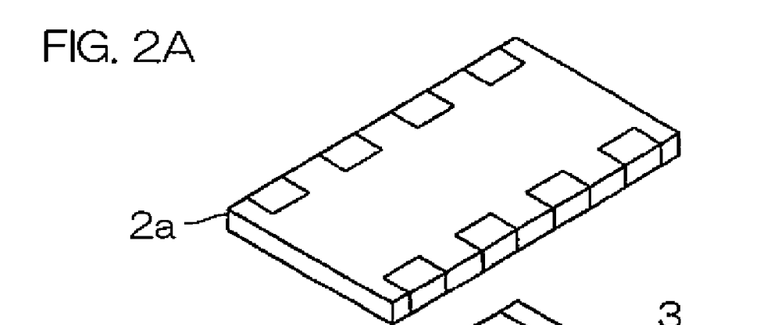
FIGS. 2A-2E show an exploded perspective view of the multilayer capacitor shown in FIG. 1.
Figure 2B:
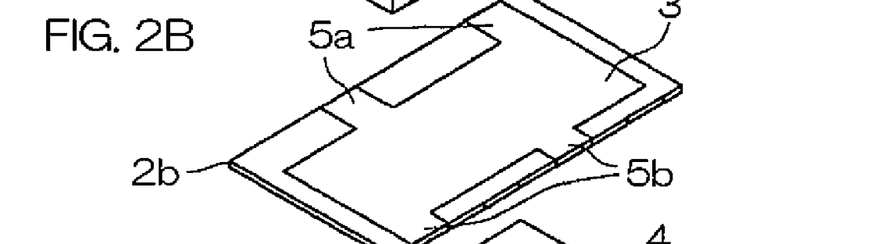
Figure 2C:
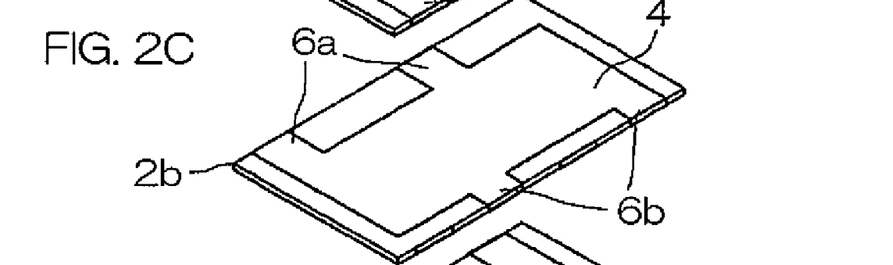
Figures 2D, 2E:
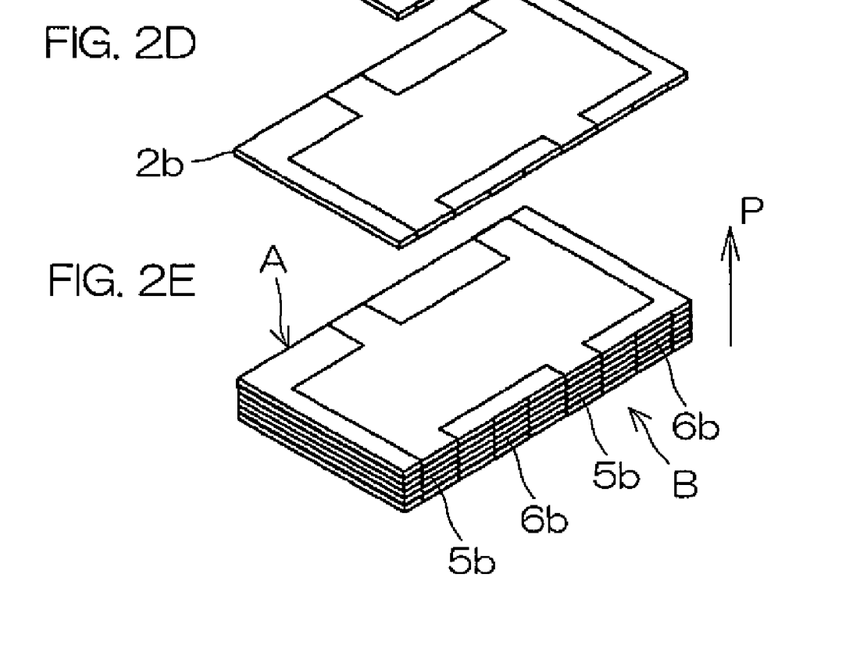

FIG. 1 is a perspective view showing the exterior appearance of one embodiment of the multilayer capacitor according to the present invention.

Meanwhile, in the specification, "lateral sides of multilayer body" refers to all the surfaces of the multilayer body except for the surfaces (stacking surfaces) perpendicular to the stacking direction.

A multilayer capacitor 10 according the present invention comprises a multilayer body 2 including a plurality of dielectric layers laminated together, first terminal electrodes 7a and third terminal electrodes 8a formed on one lateral side A of the multilayer body 2, a plurality of second terminal electrodes 7b and a plurality of fourth terminal electrodes 8b formed on another lateral side B, which is opposite to the foregoing lateral side. The fourth terminal electrodes 8b are formed at locations on the other lateral side B of the multilayer body 2 that are opposed to the first terminal electrodes 7a on the one lateral side A of the multilayer body 2, and the second terminal electrodes 7b are formed at positions on the other side B of the multilayer body 2 that are opposed to the third terminal electrodes 8a on the one lateral side of the multilayer body 2.

The first terminal electrodes 7a and second terminal electrodes 7b are connected to one terminal 7 through wiring on the substrate on which a multilayer capacitor 10 is mounted, and also the third terminal electrodes 8a and fourth terminal electrodes 8b are connected to one terminal 8 through wiring on the substrate on which the multilayer capacitor 10 is mounted.

FIGS. 2A-2E is a perspective, partially exploded view of the multilayer capacitor 10 of FIG. 1.

The multilayer body 2 is a dielectric in the form of a rectangular parallelepiped, which is formed by stacking a plural number, e.g. 70-600, of rectangular dielectric layers $2a$, $2b$. The dielectric layers $2a$ are dielectric layers that are not sandwiched between the internal electrodes 3 and 4, and disposed on the uppermost and lowermost layers of the multilayer body 2. The dielectric layers $2b$ are each disposed inside the multilayer body 2 to be sandwiched between the internal electrodes 3 and 4.

Incidentally, in FIGS. 2A-2E, the number of the stacked dielectric layers $2b$ is decreased from the actual number for simplified illustration.

The first internal electrodes 3 and second internal electrodes 4 are each formed alternately on principal surfaces of one side of the respective dielectric layers 2b. With the dielectric layers 2b being stacked, these first internal electrodes 3 and second internal electrodes 4 are disposed such that one internal electrode 3 and one internal electrode 4 are opposed to each other with one dielectric layer 2b interposed in between. Therefore, a capacitance is created according to the dielectric coefficient, thickness, facing area, and the number of layers of the dielectric layers 2b that are each interposed between the first internal electrode 3 and second internal electrode 4.

Meanwhile, the dielectric layers 2b function as effective layers for creating capacitance by the internal electrodes 3 and 4, and the dielectric layers 2a that are not sandwiched by the internal electrodes 3 and 4 are disposed on both principal surfaces of the multilayer body 2 so as to function as protective layers.

Figure 3A:
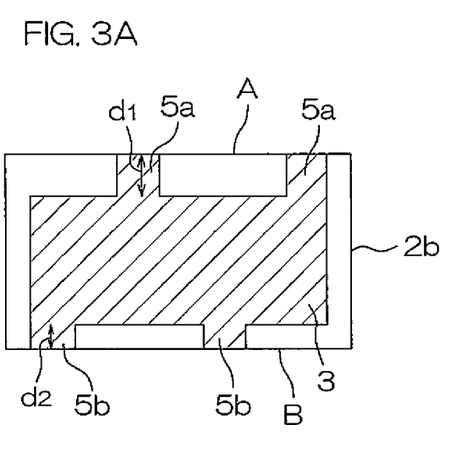
FIG. 3A is a plan view of a dielectric layer of the multilayer capacitor of FIG. 1 with a first internal electrode formed thereon viewed from top.
Figure 3B:
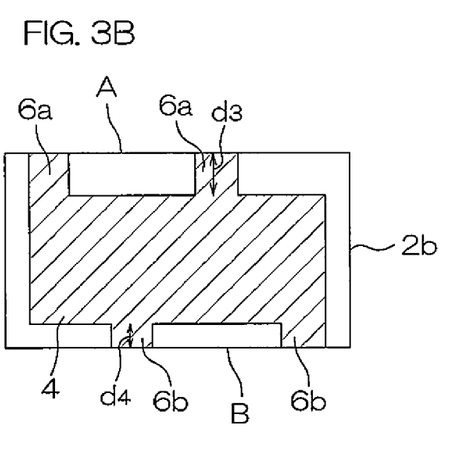
FIG. 3B is a plan view of a dielectric layer of the multilayer capacitor of FIG. 1 with a second internal electrode formed thereon viewed from top.

FIG. 3A is a plan view of a dielectric layer 2b of the multilayer capacitor 10 with a first internal electrode 3 formed thereon viewed from top, and FIG. 3B is a plan view of a dielectric layer 2b of the multilayer capacitor 10 with a second internal electrode 4 formed thereon viewed from top.

As shown in FIG. 3A, two first extension portions 5a that are extended to one lateral side A of the multilayer body 2 and two second extension portions 5b that are extended to another lateral side B opposed to the lateral side A are formed in the first internal electrode 3. The lengths of the first extension portions 5a and second extension portions 5b are represented by d1 and d2, respectively.

In addition, as shown in FIG. 3B, two third extension portions 6a that are extended to one lateral side A of the multilayer body 2 and two fourth extension portions 6b that are extended to another lateral side B opposed to the lateral side A are formed in the second internal electrode 4. The lengths of the third extension portions 6a and fourth extension portions 6b are represented by d3 and d4.

In this embodiment, the lengths are determined to be d1=d3, d2=d4 so that the first internal electrodes 3 and the second internal electrodes 4 are completely overlap each other when viewed from the stacking direction. This allows the overlapping areas between the first internal electrodes 3 and second internal electrodes 4 to be maximum, so that the capacitance created by the first internal electrodes 3 and the second internal electrodes 4 can be increased. In addition, when the capacitance is constant, the size of the multilayer capacitor 10 can be minimized.

By stacking such dielectric layers 2b, the first extension portions 5a are aligned in the stacking direction (shown by "P" in FIG. 2E) and the third extension portions 6a are aligned in the stacking direction on one lateral side A of the multilayer body 2. On another lateral side B of the multilayer body, the second extension portions 5b are vertically aligned as well as the fourth extension portions 6b are vertically aligned.

The first extension portions 5a are interconnected to one another by the first terminal electrodes 7a shown in FIG. 1, and the third extension portions 6a are interconnected to one another by the third terminal electrodes 8a. The second extension portions 5b are interconnected to one another by the second terminal electrodes 7b, and the fourth extension portions 6b are interconnected to one another by the fourth terminal electrodes 8b.

By these connections, the first terminal electrodes 7a and the third terminal electrodes 8a are arranged alternately on one lateral side A of the multilayer body 2, and the second terminal electrodes 7b and the fourth terminal electrodes 8b are arranged alternately on another lateral side B of the multilayer body 2.

This embodiment is characterized in that the lengths d1 and d3 of the first extension portions 5a and the third extension portions 6a, respectively, which are extended to one lateral side A of a couple of opposed lateral sides of the multilayer body 2, are greater than the lengths d2 and d4 of the second extension portions 5b and the fourth extension portions 6b, respectively, which are extended to the other lateral side B. That is, the following inequalities are satisfied:

d1>d2, d3>d4

The inductance created by the longer first extension portions 5a is represented by L1, the inductance created by the longer third extension portions 6a is represented by L3, the inductance created by the shorter second extension portions 5b is represented by L2, and the inductance created by the shorter fourth extension portions 6b is represented by L4.

With this arrangement, inductances L2, L4 encountered by the current flowing in and out of the terminal electrodes 7b, 8b formed on the other lateral side B are lower than inductances L1, L3 encountered by the current flowing in and out of the first terminal electrodes 7a, 8a. That is, the following relationships are satisfied:

L1>L2, L3>L4

Figure 4:
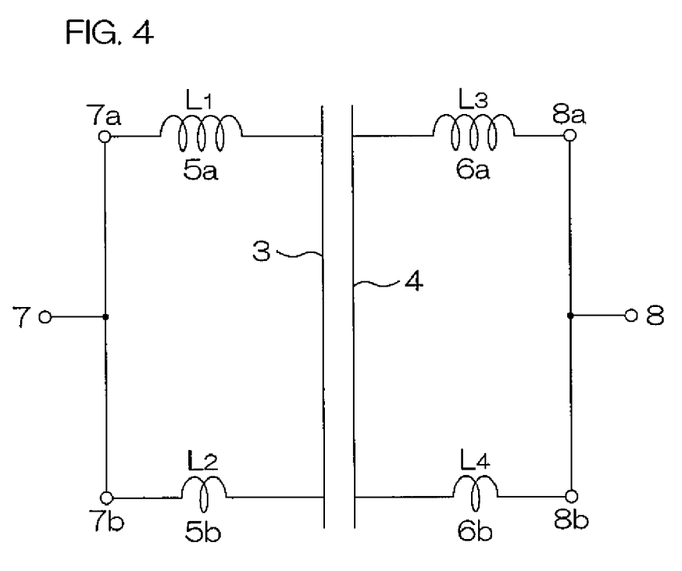
FIG. 4 is an equivalent circuit diagram of the multilayer capacitor of FIG. 1.

FIG. 4 is an equivalent circuit diagram of the multilayer capacitor 10. The first terminal electrode 7a is connected to the first internal electrode 3 through inductance L1, the second terminal electrode 7b is connected to the first internal electrode 3 through inductance L2. The third terminal electrode 8a is connected to the second internal electrode 4 through inductance L3, and the fourth terminal electrode 8b is connected to the second internal electrode 4 through inductance L4.

When a predetermined voltage is applied between the terminal 7 connected to the first terminal electrode 7a and second terminal electrode 7b and the terminal 8 connected to the third terminal electrode 8a and fourth terminal electrode 8b, since different series resonance points are formed according to which of the lateral sides A and B of the multilayer body 2 the current passing through the terminals 7 and 8 flows, the "effective frequency band" of the multilayer capacitor 10, in which these are combined together, covers a wide frequency range.

In addition, since the multilayer capacitor 10 according to the present invention has electrical characteristics that combines those of two capacitors (including a capacitor on the side close to the lateral side A of the multilayer body 2 and a capacitor on the side close to the lateral side B) with series resonance points at different frequencies, steep drop in impedance at series resonance point does not occur as compared to cases where series resonance points are formed at the same frequency in a degenerated state.

Accordingly, using this multilayer capacitor 10 makes it possible to suppress impedance to be low at the parallel resonance point created with another capacitor in a decoupling circuit.

Furthermore, the multilayer capacitor 10 according to the present invention is provided with extension portions including a plural number of 5a, 5b, 6a and 6b extended from the internal electrodes 3 and 4 (in this embodiment, the number of extension portions 5a, 5b, 6a and 6b is two, respectively). This makes the equivalent series inductance (the sum of L1 and L2 and the sum of L3 and L4 in FIG. 4) small, allowing the series resonance point to be set on the higher frequency side. Since an area in the vicinity of the series resonance point corresponds to the "effective frequency band", the multilayer capacitor 10 can be employed as a capacitor that functions on the higher frequency side in a decoupling circuit.

In addition, in the multilayer capacitor 10 according to the present invention, as shown in FIG. 1 and FIGS. 2A-2E, the first terminal electrodes 7a and the third terminal electrodes 5a are arranged alternately on the lateral side A of the multilayer body 2, and the second terminal electrodes 7b and the fourth terminal electrodes 5b are arranged alternately on the lateral side B of the multilayer body 2. Because of this arrangement, the direction of the current flowing through the first terminal electrodes 7a is reverse to the direction of the current flowing through the adjacent third terminal electrodes 8a, and the direction of the current flowing through the second terminal electrodes 7b is reverse to the direction of the current flowing through the adjacent fourth terminal electrodes 8b. For this reason, magnetic fluxes generated by the respective currents cancel each other to greatly decrease inductance in the current path through which a current flows in and out of the multilayer capacitor 10. Such an arrangement is advantageous particularly when a series resonance point is located on the higher frequency side.

Now, examples of the material and size of the multilayer capacitor 10 according to the present invention will be described.

The dielectric layers 2a, 2b are formed using a dielectric material composed mainly of, for example, barium titanates, calcium titanates, strontium titanates or the like so that each layer has a thickness of 1 μm-3 μm.

The internal electrodes 3, 4 are formed using a conductive material mainly composed of, for example, nickel, copper, nickel-copper, silver-palladium or the like to have a thickness of 0.5 μm-2 μm, for example. In addition, since most part of the outer contours of the internal electrodes 3, 4 is apart from the sides of the multilayer body 2, the overlap area between the internal electrodes 3 and 4 is set to be 70-95% of each dielectric layer 2b. For example, when the area of each dielectric layer 2b is 2.3 mm$^2$, the overlap area is set at 1.7 mm$^2$-2 mm$^2$.

The terminal electrodes 7a, 7b and terminal electrodes 8a, 8b are formed using a conductive material mainly composed of, for example, nickel, copper, silver, palladium or the like to have a thickness of 0.5 μm-2 μm, for example.

The terminal electrodes 7a, 7b and terminal electrodes 8a, 8b are formed on lateral sides of the multilayer body 2 across the stacking direction to a height of, for example, 200 μm-300 μm.

Incidentally, the surfaces of the terminal electrodes 7a, 7b and terminal electrodes 8a, 8b are preferably coated with a conductive material such as tin, solder, gold or the like so as to ensure good connection to external wirings of a wiring board and the like.

Figure 5:
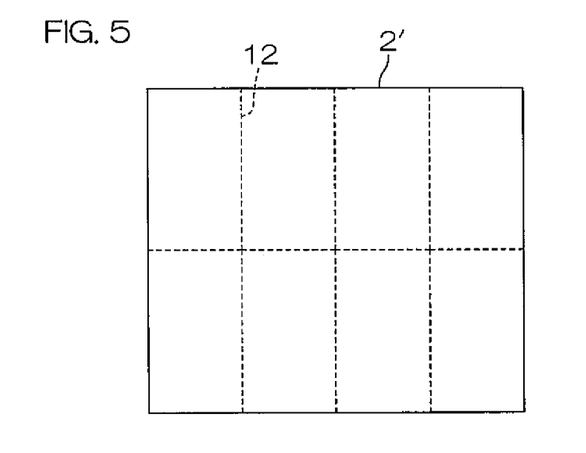
FIG. 5 is a plan view of a green sheet composed of a plurality of rectangular block areas arranged horizontally and vertically.
Figure 6:
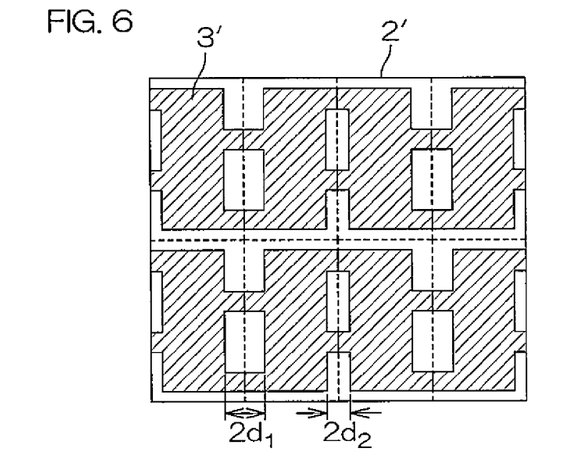
FIG. 6 is a plan view of a first composite green sheet with a first internal electrode pattern formed thereon.

Now, a method of producing a multilayer capacitor 10 according to the present invention is described.

a. A plural number of green sheets are prepared. When, for example, the dielectric layers comprising a dielectric material mainly composed of barium titanates are fabricated, powder of barium titanates is mixed with an appropriate organic solvent, glass frit, organic binder and the like to be brought into a slurry-like state, which is then processed by the doctor blade method or the like into a ceramic green sheet 2h' with a predetermined shape and thickness. A plural number of ceramic green sheets 2' are prepared. As shown in FIG. 5, each ceramic green sheet 2' consists of horizontally and vertically arranged rectangular block areas (areas surrounded by broken lines 12) each of which is to be provided with individual internal electrodes 3 and 4. Although one ceramic green sheet is divided into eight block areas in the case of FIG. 5, the number is not limited to eight but actually more number of block areas may be provided.

b. As shown in FIG. 6, internal electrode patterns 3' each including a first internal electrode 3 at a central area, first extension portions 5a and second extension portions 5b that are extended from the first internal electrode 3 to a couple of sides of each block area to have different lengths are formed in the block areas on one principal surface of the foregoing ceramic green sheet. The first internal electrode patterns 3' are formed by mixing, for example, nickel powder with an appropriate organic solvent, glass frit, an organic binder and the like to produce a conductor paste, which is printed and applied onto the ceramic green sheet 2' by screen printing or the like to be formed into a predetermined pattern. It is also possible to prepare the conductor paste so that it includes the dielectric material included in the ceramic green sheet added and mixed therein. The ceramic green sheet 2' on which the first internal electrode patterns 3' are formed is referred to as "first composite green sheet".

Figure 7:
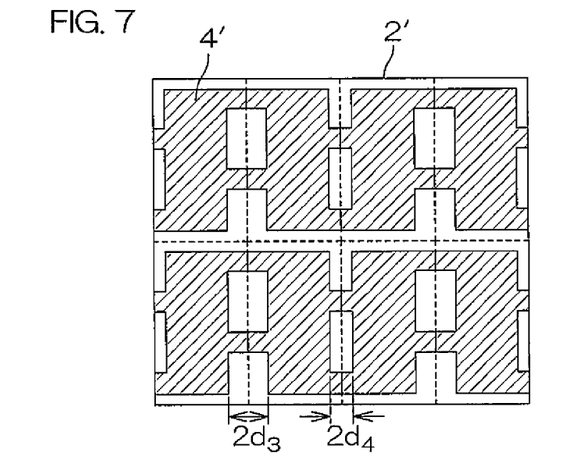
FIG. 7 is a plan view of a second composite green sheet with a second internal electrode pattern formed thereon.

Meanwhile, while the first internal electrode patterns 3' are formed by firing the applied conductor paste, other processes, for example, electroless plating may also be used for the pattern formation. Using this method is advantageous in that portions exposed on the lateral sides (which correspond to the extension portions) can be formed with high precision.

c. As shown in FIG. 7, second internal electrode patterns 4' each including a second internal electrode 4 at a central area, third extension portions 6a and fourth extension portions 6b that are extended from the second internal electrode 4 to a couple of sides of each block area to have different lengths are formed in the block areas on one principal surface of the foregoing ceramic green sheet 2'. The process of forming the second internal electrode patterns 4' is the same as described in (b.) above. The ceramic green sheet 2' on which the second internal electrode patterns 4' are formed is referred to as "second composite green sheet".

d. A plural number of the foregoing first composite green sheets and the foregoing second composite green sheets are stacked by overlapping the foregoing block areas so that the first internal electrode patterns 3' and the second internal electrode patterns 4' are opposed to each other with the ceramic green sheet 2' interposed in between, and then pressure bonded to obtain a "multilayer sheet".

e. The multilayer sheet is cut along the sides of the respective block areas to obtain a plurality of multilayer bodies that are separated by each block area. The foregoing first and second extension portions 5a, 5b and the foregoing third and fourth extension portions 6a, 6b are exposed at the cut surfaces of the multilayer bodies.

Figure 13:
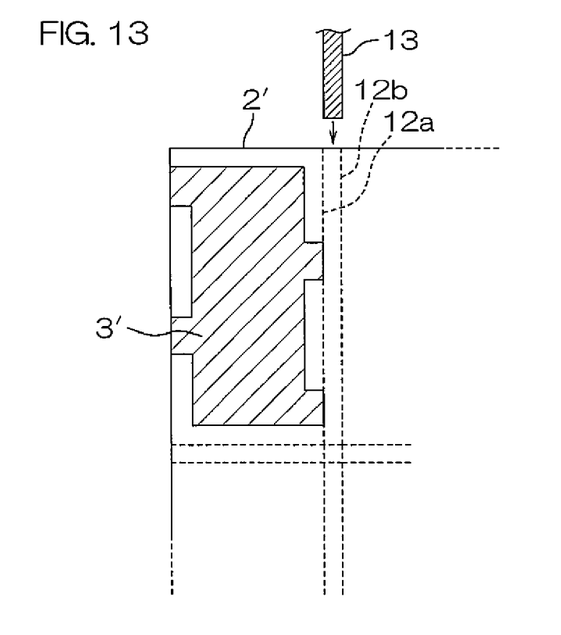
FIG. 13 is a plan view showing an example in which the lines dividing the area into a plurality of block areas are parallel lines that are spaced apart by a predetermined distance.

Meanwhile, the cut lines for separating a plurality of block areas are preferably parallel lines 12a and 12b that are spaced apart by a predetermined distance which corresponds to the cutting margin of a cutter 13 as shown in FIG. 13.

f. The multilayer body is fired at a temperature of 1100° C.-1400° C. After this firing, the ceramic green sheets 2' and the conductor paste are formed into the dielectric layers 2a, 2b and internal electrodes 3, 4, respectively. Incidentally, the degree of shrinkage of the ceramic green sheet 2' used in this process during the firing is, for example, about 10%-20%.

g. A conductor paste is printed, applied and thermally bonded along the stacking direction in the form of strips by screen printing or the like to the portions on the cut surfaces of the fired multilayer body where the first and second extension portions 5a, 5b, and the third and fourth extension portions 6a, 6b are exposed. Through this process, the first to fourth terminal electrodes 7a, 7b, 8a, 8b for electrically interconnecting the foregoing first, second, third and fourth extension portions are formed.

h. A film comprising tin, solder or gold is formed on the first to fourth terminal electrodes 7a, 7b, 8a, 5b, for example, by electroless plating.

A multilayer capacitor 10 according to the present invention is produced in the above described way.

Meanwhile, in the production process described above, the first internal electrode patterns 3' each includes the first extension portions 5a and second extension portions 5b that are extended from the first internal electrode 3 to a couple of sides of each block area to have different lengths. In addition, the second internal electrode patterns 4' each includes the third extension portions 6a and fourth extension portions 6b that are extended from the second internal electrode 4 to a couple of sides of each block area to have different lengths.

However, another production process may be adopted, in which the lengths of the first extension portions 5a and second extension portions 5b from the sides of the block area are set to be equal, and the lengths of the third extension portions 6a and fourth extension portions 6b from the sides of the block area are set to be equal, and in the cutting process, the multilayer sheet is cut along cutting lines that are spaced apart from the sides of each block area by a predetermined distance so as to be separated by each block area.

Figure 15:
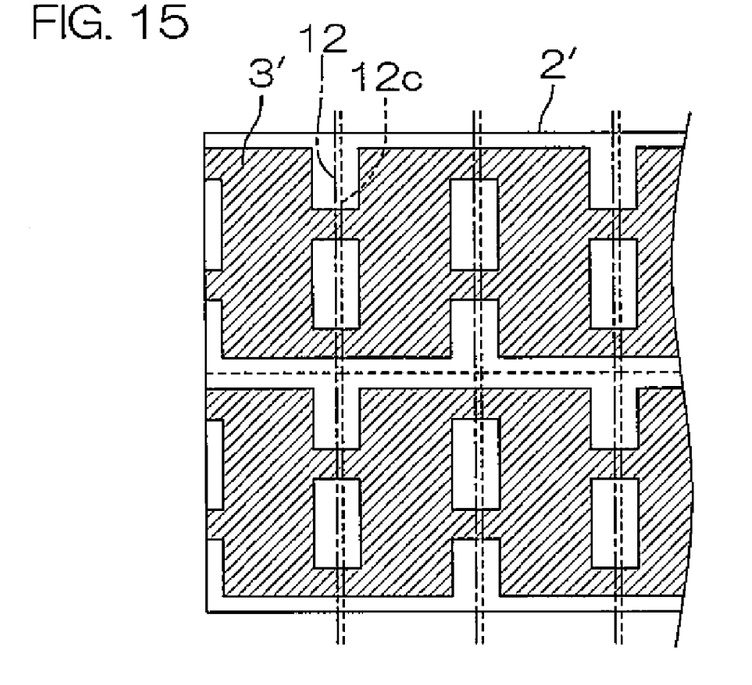
FIG. 15 is a plan view showing a first composite green sheet with first internal electrode patterns formed thereon according to a modified embodiment.
Figure 16:
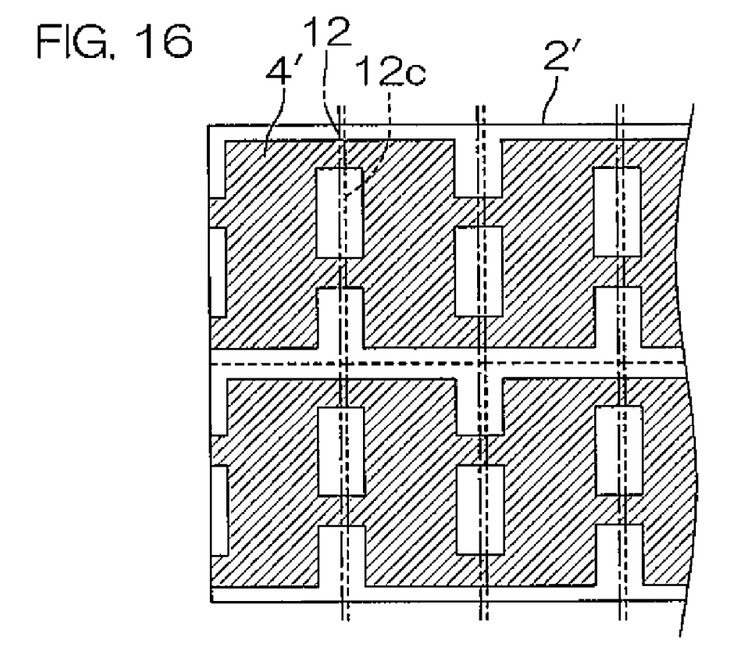
FIG. 16 is a plan view showing a second composite green sheet with second internal electrode patterns formed thereon according to a modified embodiment.

FIG. 15 is a plan view for illustrating this cutting method, showing a first composite green sheet on which first internal electrode patterns 3' are formed. FIG. 16 is a plan view showing a second composite green sheet on which second internal electrode patterns 4' are formed. The lengths of the first extension portions 5a and second extension portions 5b of the first internal electrode patterns 3' from the sides 12 (shown by chain lines) of the block areas are equal, and the lengths of the third extension portions 6a and fourth extension portions 6b of the second internal electrode patterns 4' from the sides 12 (shown by chain lines) of the block areas are equal.

However, the cutting lines 12c shown by dashed lines are offset by a predetermined distance from the sides 12 of the block areas. The offset distance is (d1-d2)/2 in the case of the first composite green sheet, and (d3-d4)/2 in the case of the second composite green sheet. By offsetting the cutting lines 12c by a predetermined distance from the sides 12 of the block areas in this way, it is no longer necessary to extend the first extension portions 5a and the second extension portions 5b from the first internal electrode 3 to have different lengths, and also it is no longer necessary to extend the third extension portions 6a and the fourth extension portions 6b from the second internal electrode 4 to have different lengths. Accordingly, the shapes of the first internal electrode patterns 3' and the second internal electrode patterns 4' can be simplified.

Incidentally, when cutting a plural number of block areas, a cutting margin is required for the cutter 13. Therefore, in the same way as shown in FIG. 13, the locations of the cutting lines 12c are preferably determined taking the cutting margin into consideration.

Hereinafter, modified patterns of the internal electrodes 3 and 4 will be described.

Figure 8A:
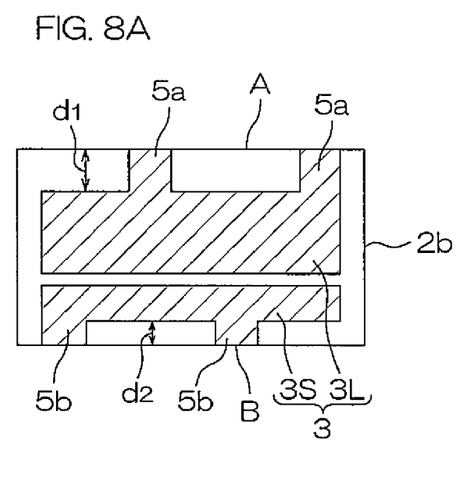
FIG. 8A is a plan view of a dielectric layer with a first internal electrode formed thereon of another embodiment of the multilayer capacitor according to the present invention viewed from top.
Figure 8B:
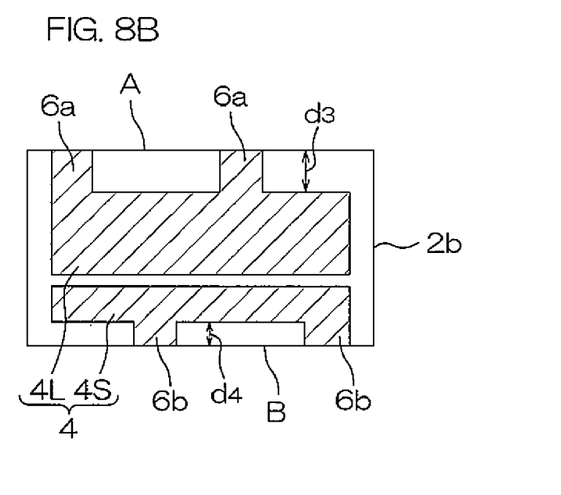
FIG. 8B is a plan view of a dielectric layer with a second internal electrode formed thereon of another embodiment of the multilayer capacitor according to the present invention viewed from top.

FIG. 8A is a top plan view of a dielectric layer 2b on which a first internal electrode 3 is formed, and FIG. 8B is a top plan view of a dielectric layer 2b on which a second internal electrode 4 is formed.

To describe differences between these internal electrodes 3, 4 and the internal electrodes 3, 4 shown in FIGS. 3A and 3B, the first internal electrode 3 in FIGS. 8A, 8B is electrically divided into two areas: a first region 3L that is on the side of one lateral side A of a couple of opposed lateral sides of the multilayer body 2 and a second region 3S that is on the side of the other lateral side B. Also, the second internal electrode 4 is electrically divided into two areas: a first region 4L that is on the side of one lateral side A of the multilayer body 2 and a second region 4S that is on the side of the other lateral side B.

As shown in FIG. 8A, two first extension portions 5a extended to the lateral side A of the multilayer body 2 are formed in the first region 3L, and two second extension portions 5b extended to the lateral side B are formed in the second region 3S.

In addition, as shown in FIG. 8B, two third extension portions 6a extended to the lateral side A of the multilayer body 2 are formed in the first region 4L, and two fourth extension portions 6b extended to the lateral side B are formed in the second region 4S.

As in the structure shown in FIGS. 3A and 3B, the lengths d1 and d3 of the first extension portions 5a and the third extension portions 6a extended to one lateral side A are larger than the lengths d2 and d4 of the second extension portions 5b and fourth extension portions 6b extended to the other lateral side B, respectively. As a result, inductances L2, L4 encountered by the current flowing in and out of the terminal electrodes 7b, 5b formed on the other lateral side B are lower than inductances L1, L3 encountered by the current flowing in and out of the first terminal electrodes 7a, 8a formed on the lateral side A.

Figure 9:
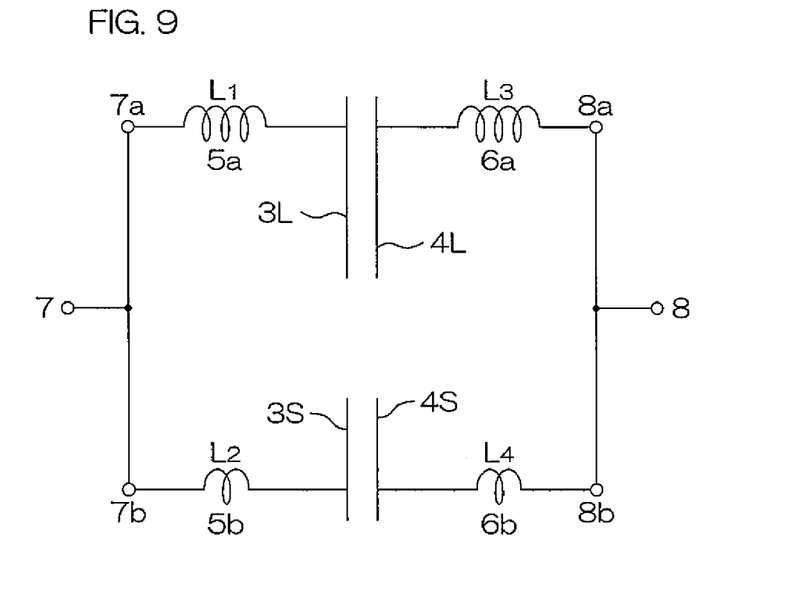
FIG. 9 is an equivalent circuit diagram showing a multilayer capacitor having the dielectric layers in FIGS. 8A and 8B.

FIG. 9 is an equivalent circuit diagram of this multilayer capacitor 10. The first terminal electrode 7a is connected through inductance L1 to the first region 3L, which is one part of the divided first internal electrode 3, and the second terminal electrode 7b is connected through inductance L2 to the second region 3S, which is the other part of the divided first internal electrode 3. The third terminal electrode 8a is connected through inductance L3 to the first region 4L, which is one part of the divided second internal electrode 4, and the fourth terminal electrode 8b is connected through inductance L4 to the second region 4S, which is the other part of the divided second internal electrode 4.

In particular, when the areas of the first regions 3L and 4L are larger than the areas of the second regions 3S and 4S, the capacitance between the first and second terminal electrodes 7a and 8a formed on the lateral side A of a couple of opposed lateral sides of the multilayer body 2 is larger than the capacitance between the third and fourth terminal electrodes 7b and 8b formed on the other lateral side.

Accordingly, the difference in frequency between series resonance points depending upon which of the areas on the side of lateral side A and on the side of lateral side B the current flowing in and out of the terminals 7 and 8 passes through becomes larger as compared to the case of FIGS. 3A and 3B. Therefore, a wider "effective frequency band" can be formed as a result of combining these.

Meanwhile, when the difference between the impedance at the series resonance point between the first terminal electrode 7a and the third terminal electrode 8a and the impedance at the series resonance point between the second terminal electrode 7b and the fourth terminal electrode 8b is large, the impedance between the terminals 7 and 8 fails to be flat across the "effective frequency band". In such a case, it is preferable to control the equivalent series resistance by adjusting the widths of the extension portions 5a, 5b, 6a, 6b. This allows impedance to be uniform across the "effective frequency band". For example, when the width of the first extension portion 5a is increased, the equivalent series resistance of the first extension portion 5*b* becomes small, which causes the impedance for the current passing through the first extension portion 5*a* to be low.

Now, another example of modified patterns of the internal electrodes 3, 4 is described.

Figure 10A:
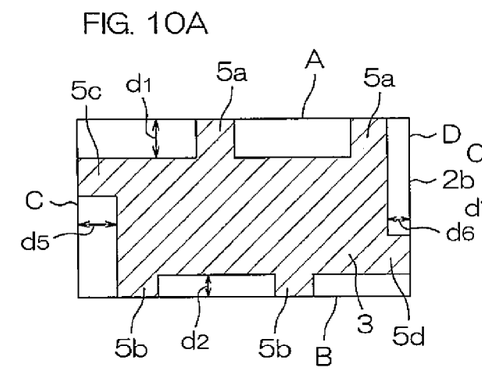
FIG. 10A is a plan view of a dielectric layer with a first internal electrode formed thereon of still another embodiment of the multilayer capacitor according to the present invention viewed from top.
Figure 10B:
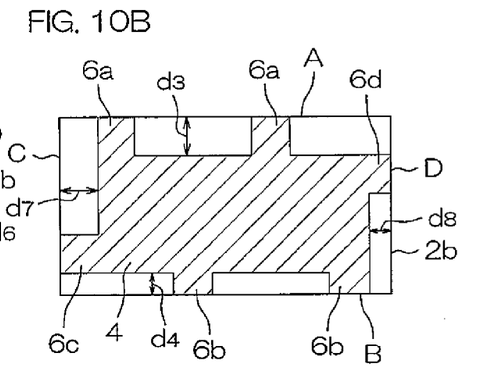
FIG. 10B is a plan view of a dielectric layer with a second internal electrode formed thereon of still another embodiment of the multilayer capacitor according to the present invention viewed from top.

FIGS. 10A, 10B are plan views showing another example of dielectric layer 2*b* with a first internal electrode 3 formed thereon and dielectric layer 2*b* with a second internal electrode 4 formed thereon.

While in the embodiments shown in FIGS. 3A, 3B, 8A, 8B, extension portions 5*a*, 5*b*, 6*a*, 6*b* are extended only to a couple of sides A and B of the multilayer body 2, as shown in FIG. 10A, it is also possible to provide a fifth extension portion 5*c* and a sixth extension portion 5*d* extended to another couple of sides C, D, and as shown in FIG. 10B, to provide a seventh extension portion 6*c* extended to the side C and a eighth extension portion 6*d* extended to the side D.

In this structure, the lengths of the fifth extension portion 5*c* and the seventh extension portion 6*c* that are extended to one of the couple of opposed sides C of the multilayer body 2 are represented by d5 and d7, respectively. The lengths of the sixth extension portion 5*d* and the eighth extension portion 6*d* that are extended to the other side D are represented by d6 and d8, respectively.

The length d5 of the fifth extension portion 5*c* is larger than the length d6 of the sixth extension portion 5*d*, and the length d7 of the seventh extension portion 6*c* is larger than the length d8 of the eighth extension portion 6*d*. That is, the following relationships are satisfied:

d5>d6, d7>d8

Figure 11:
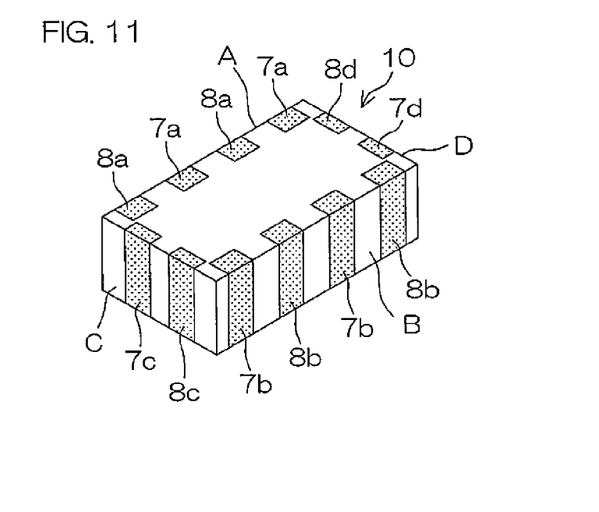
FIG. 11 is a perspective view showing the external appearance of a multilayer capacitor having the dielectric layers in FIGS. 10A and 10B.

In the state of a multilayer body 2, the fifth extension portions 5*c* are interconnected to one another by a fifth terminal electrode 7*c* formed on the side C of the multilayer body 2 shown in FIG. 11, and the sixth extension portions 5*d* are interconnected to one another by a sixth terminal electrode 7*d* formed on the side D of the multilayer body 2. The seventh extension portions 6*c* are interconnected to one another by a seventh terminal electrode 8*c* formed on the side C of the multilayer body 2, and the eighth extension portions 6*d* are interconnected to one another by a eighth terminal electrode 8*d* formed on the side D of the multilayer body 2.

The fifth terminal electrode 7*c* and sixth terminal electrode 7*d* together with the first terminal electrodes 7*a* and second terminal electrodes 7*b* are connected to one terminal 7 through wiring on the substrate on which the multilayer capacitor 10 is mounted. The seventh terminal electrode 8*c* and eighth terminal electrode 8*d* together with the third terminal electrodes 8*a* and fourth terminal electrodes 8*b* are connected to one terminal S through wiring on the substrate on which the multilayer capacitor 10 is mounted.

Accordingly, as electrical characteristics between the terminals 7 and 8, different series resonance points are formed according to the paths of the terminal electrodes formed on the respective sides A, B, C, D.

For example, when it is arranged such that the length d5 of the fifth extension portion 5*c* and the length d7 of the seventh extension portion 6*c* are different from the length d1 of the first extension portions 5*a* and the length d3 of the third extension portions 6*a*, and also the length d6 of the sixth extension portion 5*d* and the length d8 of the eighth extension portion 6*d* are different from the length d2 of the second extension portions 5*b* and the length d4 of the fourth extension portions 6*b*, the number of series resonance points with different frequencies is increased. As a result, a particularly broad "effective frequency band" is realized as overall electrical characteristics of the multilayer capacitor 10.

Meanwhile, in the foregoing arrangement, it is also possible that the length d5 of the fifth extension portion 5*c* and the length d7 of the seventh extension portion 6*c* are equal to the length d1 of the first extension portions 5*a* and the length d3 of the third extension portions 6*a*, and also the length d6 of the sixth extension portion 5*d* and the length dS of the eighth extension portion 6*d* are equal to the length d2 of the second extension portions 5*b* and the length d4 of the fourth extension portions 6*b*. This makes it possible to take a maximum overlap area between the first internal electrode 3 and the second internal electrode 4, so that the capacitance created between the first internal electrode 3 and the second internal electrode 4 can be increased. In addition, when the capacitance is constant, the size of the multilayer capacitor 10 can be minimized.

While specific embodiments of the present invention have been described so far, implementation of the present invention is not limited to the foregoing embodiments. For example, the relationships between the length d1 of the first extension portions, the length d2 of the second extension portions, the length d3 of the third extension portions, and the length d4 of the fourth extension portions may be such that only one of d1>d2, d3>d4 is satisfied. In addition, the relationships between the length d5 of the fifth extension portions, the length d6 of the six extension portions, the length d7 of the seventh extension portions and the length d8 of the eighth extension portions may be such that only d5>d6 is satisfied, or only d7>d8 is satisfied.

Figure 12A:
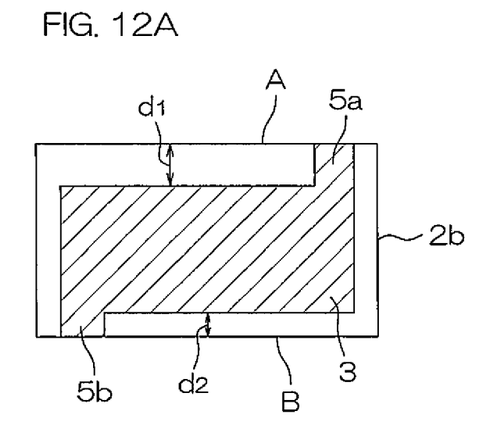
FIG. 12A is a plan view showing a first internal electrode 3 of a multilayer capacitor in which one extension portion is extended to each of the lateral sides at a multilayer body 2.
Figure 12B:
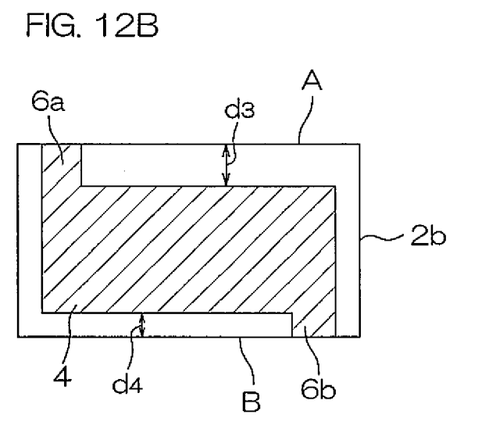
FIG. 12B is a plan view showing a second internal electrode 3(4?) of a multilayer capacitor in which one extension portion is extended to each of the lateral sides of a multilayer body 2.

Furthermore, the multilayer capacitor 10 according to the present invention may be arranged, as shown FIGS. 12A and 12B, such that the first internal electrode 3 is provided with one first extension portion 5*a* extended to one of opposed lateral sides A of the multilayer body 2, and one second extension portion 5*b* extended to the other lateral side B. Also in the same manner, the second internal electrode 4 may be provided with one third extension portion 6*a* extended to the lateral side A of the multilayer body 2 and one fourth extension portion 6*b* extended to the other lateral side B. By arranging the lengths d1, d3 of the extension portions 5*a*, 6*a* to be different from the lengths d2, d4 of the extension portions 5*b*, 6*b*, different series resonant points can be provided, and this allows the multilayer capacitor 10 in which these are combined together to have an "effective frequency band" that covers a wide frequency band.

EXAMPLE

A plural number of dielectric layers comprising a dielectric material mainly composed of barium titanates were laminated together to produce a multilayer body 2 of 2.0 mm in length, 1.2 mm in width, and 0.85 mm in height. Fifty layers of first internal electrodes 3 and second internal electrodes 4 made of nickel were formed so that they were opposed to one another with dielectric layers interposed in between inside the multilayer body 2. A first terminal electrode 7 and second terminal electrode 8 were formed by baking copper on side surfaces of the multilayer body 2, which was then fired. A multilayer capacitor 10 was produced in the foregoing way.

The extension portions were formed, as shown in FIGS. 2A-2E and FIGS. 3A and 3B, by extending two portions to a couple of opposed lateral sides A and B, respectively, of the multilayer body. The width with respect to the extending direction was 100 μm, and the lengths in the extending direction and the shapes of the internal electrodes were as follows:

(1) Multilayer capacitor 1OX(present invention): the lengths of the first extension portions and third extension portions extended to one of a couple of lateral sides A of the multilayer body 2 were 200 μm, and the lengths of the second extension portions and fourth extension portions extended to the other lateral side B were 120 μm. The internal electrodes were not divided.

(2) Multilayer capacitor 10Y (present invention): the lengths of the extension portions were the same as the foregoing multilayer capacitor 10X, and the internal electrodes were each electrically divided into two regions including a first region on the side of one lateral side A of the multilayer body and a second region on the side of the other lateral side B, where the area of the first region was larger than the area of the second region. The ratio between the areas was set to be about 3:2.

(3) Multilayer capacitor 10Z (comparative example): the lengths of the extension portions were uniformly 160 μm and the internal electrodes were not divided.

Figure 14:
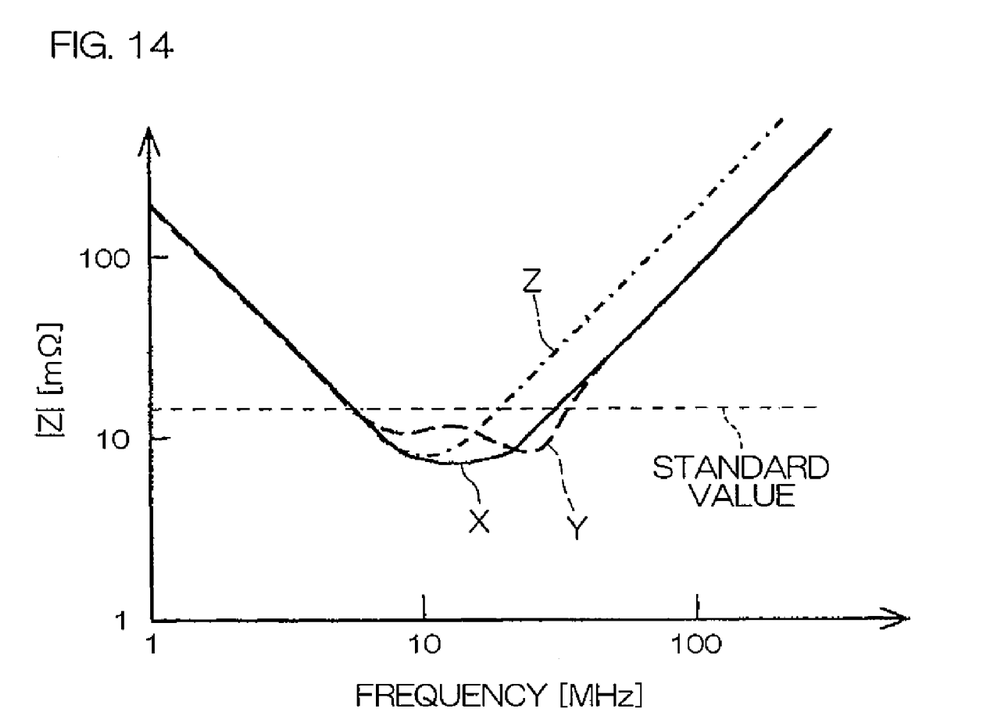
FIG. 14 is a graph showing impedance characteristics of a multilayer capacitor according to the present invention and a conventional multilayer capacitor.

Impedance characteristics between the terminals 7 and 8 were measured for each of the multilayer capacitors 10X-10Z, the results of which are shown in FIG. 14.

FIG. 14 is a graph showing impedance characteristics of the multilayer capacitors.

In FIG. 14, the horizontal axis represents frequency (unit: MHz), and the vertical axis represents impedance (unit: mΩ).

The measurements of impedance were carried out at a frequency band of 1 MHz to several hundred MHz.

The characteristic curve X indicates an impedance characteristic of the multilayer capacitor 10X of the present invention, the characteristic curve Y indicates an impedance characteristic of the multilayer capacitor 10Y of the present invention, and the characteristic curve Z indicates an impedance characteristic of a conventional multilayer capacitor 10Z.

Incidentally, in the present invention, the value used as the standard value of impedance is 15 mΩ, and a frequency band at which impedance is lower than this value is referred to as the "effective frequency band".

It is apparent from the graph of FIG. 14 that the impedance characteristic of the multilayer capacitor 10X according to the present invention indicates a wider "effective frequency band" than that of the conventional multilayer capacitor 10Z.

In addition, while the impedance characteristic of the multilayer capacitor 10Y according to the present invention indicates that the minimum value of impedance is somewhat higher as compared to that of the multilayer capacitor 10X of the present invention, the "effective frequency band" is wider.

In other words, it has been verified that, since the multilayer capacitors 10X and 10Y according to the present invention have electrical characteristics combining two electrical characteristics with series resonance points at different frequencies as a result of arranging the extension portions on the side of the lateral side A to be longer than the extension portions on the side of the lateral side B, the "effective frequency band" is widened, and impedance at the parallel resonance point created with another capacitor in a decoupling circuit can be suppressed to be low.

The invention claimed is:

1. A multilayer capacitor comprising:
a multilayer body including a plurality of dielectric layers;
first internal electrodes and second internal electrodes arranged alternately so as to be opposed to one another with the dielectric layer interposed therebetween inside the multilayer body;
first extension portion extended from the first internal electrode to one lateral side of the multilayer body at one or a plurality of locations;
second extension portion extended from the first internal electrode to another lateral side of the multilayer body at one or a plurality of locations;
third extension portion extended from the second internal electrode to any one lateral side of the multilayer body;
fourth extension portion extended from the second internal electrode to any one lateral side of the multilayer body other than the lateral side to which the third extension portions are extended;
a first terminal electrode for electrically interconnecting the first extension portions located vertically in the stacking direction to one another;
a second terminal electrode for electrically interconnecting the second extension portions located vertically in the stacking direction to one another;
a third terminal electrode for electrically interconnecting the third extension portions located vertically in the stacking direction to one another; and
a fourth terminal electrode for electrically interconnecting the fourth extension portions located vertically in the stacking direction to one another, wherein the multilayer capacitor satisfies one or both of the following relationships (a) and (b):
(a) the length of the first extension portion is different from the length of the second extension portion,
(b) the length of the third extension portion is different from the length of the fourth extension portion.

2. The multilayer capacitor according to claim 1, wherein the first extension portions are extended from the first internal electrodes at a plurality of locations to be connected respectively to a plural number of first terminal electrodes;
the second extension portions are extended from the first internal electrodes at a plurality of locations to be connected respectively to a plural number of second terminal electrodes;
the third extension portions are extended from the second internal electrodes at a plurality of locations to be connected respectively to a plural number of third terminal electrodes; and
the fourth extension portions are extended from the second internal electrodes at a plurality of locations to be connected respectively to a plural number of fourth terminal electrodes.

3. The multilayer capacitor according to claim 1, wherein the dielectric layers have rectangular shapes, the lateral side to which the first extension portions are extended is the same side as the lateral side to which the third extension portions are extended, and the lateral side to which the second extension portions are extended is the same side as the lateral side to which the fourth extension portions are extended, and is a side opposed to the lateral side to which the first extension portions are extended.

4. The multilayer capacitor according to claim 3, wherein each of the first and second internal electrodes is electrically divided into two regions including a first region near one lateral side of the multilayer body and a second region near the other lateral side.

5. The multilayer capacitor according to claim 4, wherein the area of the first region is different from the area of the second region.

6. The multilayer capacitor according to claim 3, wherein a plurality of the first terminal electrodes and a plurality of the third terminal electrodes are arranged alternately on one lateral side of the multilayer body and a plurality of the second terminal electrodes and a plurality of the fourth terminal electrodes are arranged alternately on the other lateral side of the multilayer body.

7. The multilayer capacitor according to claim 1, further comprising:
   fifth extension portion extended from the first internal electrode to a lateral side of the multilayer body at one or a plural number of locations;
   sixth extension portion extended from the first internal electrode to a lateral side of the multilayer body at one or a plural number of locations;
   seventh extension portion extended from the second internal electrode to a lateral side of the multilayer body at one or a plural number of locations;
   eighth extension portion extended from the second internal electrode to a lateral side of the multilayer body at one or a plural number of locations;
   a fifth terminal electrode for electrically interconnecting the fifth extension portions located vertically in the stacking direction;
   a sixth terminal electrode for electrically interconnecting the sixth extension portions located vertically in the stacking direction;
   a seventh terminal electrode for electrically interconnecting the seventh extension portions located vertically in the stacking direction; and
   an eighth terminal electrode for electrically interconnecting the eighth extension portions located vertically in the stacking direction, wherein the multilayer capacitor satisfies one or both of the following relationships (c) and (d):
   (c) the length of the fifth extension portion is different from the length of the sixth extension portion,
   (d) the length of the seventh extension portion is different from the length of the eighth extension portion.

8. The multilayer capacitor according to claim 7, wherein the length of the first extension portion, the length of the second extension portion, the length of the fifth extension portion and the length of the sixth extension portion are different from one another.

9. The multilayer capacitor according to claim 7, wherein the length of the third extension portion, the length of the fourth extension portion, the length of the seventh extension portion and the length of the eighth extension portion are different from one another.

10. The multilayer capacitor according to claim 1, wherein the dielectric layers have rectangular shapes, and the one lateral side and the other lateral side are a couple of opposed lateral sides of the multilayer body.

11. A process of producing a multilayer capacitor comprising steps of:
   a. producing a plural number of ceramic green sheets;
   b. preparing a first composite green sheet by forming a first internal electrode pattern provided with a first extension portion and a second extension portion each having a different length from each other in each block area on one principal surface of the ceramic green sheet;
   c. preparing a second composite green sheet by forming a second internal electrode pattern provided with a third extension portion and a fourth extension portion each having a different length from each other in each block area on one principal surface of another ceramic green sheet;
   d. producing a multilayer sheet by stacking a plurality of the first composite green sheets and the second composite green sheets so that the first internal electrode patterns and the second internal electrode patterns are opposed to each other with the ceramic green sheets interposed therebetween and by pressure bonding;
   e. cutting the multilayer sheet along the respective sides of the block areas to obtain multilayer bodies separated by each block area;
   f. firing the multilayer bodies; and
   g. forming a first terminal electrode for electrically interconnecting the first extension portions to one another, a second terminal electrode for electrically interconnecting the second extension portions to one another, a third terminal electrode for electrically interconnecting the third extension portions to one another and a fourth terminal electrode for electrically interconnecting the fourth extension portions to one another on cut surfaces of the fired multilayer bodies.

12. A process of producing a multilayer capacitor comprising the steps of:
   a. producing a plural number of ceramic green sheets;
   b. preparing a first composite green sheet by forming a first internal electrode pattern provided with a first extension portion and a second extension portion each having the same length in each block area on one principal surface of the ceramic green sheet;
   c. preparing a second composite green sheet by forming a second internal electrode pattern provided with a third extension portion and a fourth extension portion each having the same length in each block area on one principal surface of another ceramic green sheet;
   d. producing a multilayer sheet by stacking a plurality of the first composite green sheets and the second composite green sheets so that the first internal electrode patterns and the second internal electrode patterns are opposed to each other with the ceramic green sheets interposed therebetween and by pressure bonding;
   e. cutting the multilayer sheet along a cutting line offset by a predetermined distance from the respective sides of the block areas to obtain multilayer bodies separated by each block area;
   f. firing the multilayer bodies; and
   g. forming a first terminal electrode for electrically interconnecting the first extension portions to one another, a second terminal electrode for electrically interconnecting the second extension portions to one another, a third terminal electrode for electrically interconnecting the third extension portions to one another and a fourth terminal electrode for electrically interconnecting the fourth extension portions to one another on cut surfaces of the fired multilayer bodies.

* * * * *